United States Patent [19]

Tolnai

[11] 4,122,726
[45] Oct. 31, 1978

[54] LEVER MECHANISM FOR A MIXING VALVE

[75] Inventor: Julius L. Tolnai, Los Angeles, Calif.

[73] Assignee: Price-Pfister Brass Mfg. Co., Pacoima, Calif.

[21] Appl. No.: 467,712

[22] Filed: May 7, 1974

[51] Int. Cl.² ............................................. F16H 21/02
[52] U.S. Cl. ..................................... 74/21; 137/636.2
[58] Field of Search ............ 74/21; 137/625.17, 636.2, 137/636.3, 636.4

[56] References Cited

U.S. PATENT DOCUMENTS

| 2,471,289 | 5/1949 | Sedgwick | 137/625.17 |
| 2,839,083 | 6/1958 | Moen | 137/636.2 |
| 3,173,444 | 3/1965 | Bucknell et al. | 137/636.4 |
| 3,369,566 | 2/1968 | Schmitt et al. | 137/636.2 |
| 3,433,264 | 3/1969 | Parkison | 137/625.17 |

Primary Examiner—Benjamin W. Wyche
Assistant Examiner—Wesley S. Ratliff, Jr.

Attorney, Agent, or Firm—Flam & Flam

[57] ABSTRACT

The lever mechanism includes an easy-to-clean cowl which covers the end of a fixture containing a mixing valve. A generally cylindrical fulcrum bracket, attached to the valve body, forms the topmost static element of the fixture. The cowl has a central cup that projects centrally into the fulcrum bracket. The mixing valve control stem is pivotally coupled to the bottom of this cup. A cowl skirt surrounds the fulcrum bracket. A fulcrum member, advantageously either a pin or a ball, is attached to the cowl interior and projects into an annular, outwardly opening receiving groove at the periphery of the fulcrum bracket. Tilting of the operating lever cowl moves the valve stem axially to control flow volume. During such tilting the fulcrum member moves radially in the receiving groove; this changes the location of the fulcrum point so as to prevent lateral displacement of the valve stem. Angular motion of the cowl imparts concomitant mixture controlling angular movement to the mixing valve stem.

21 Claims, 12 Drawing Figures

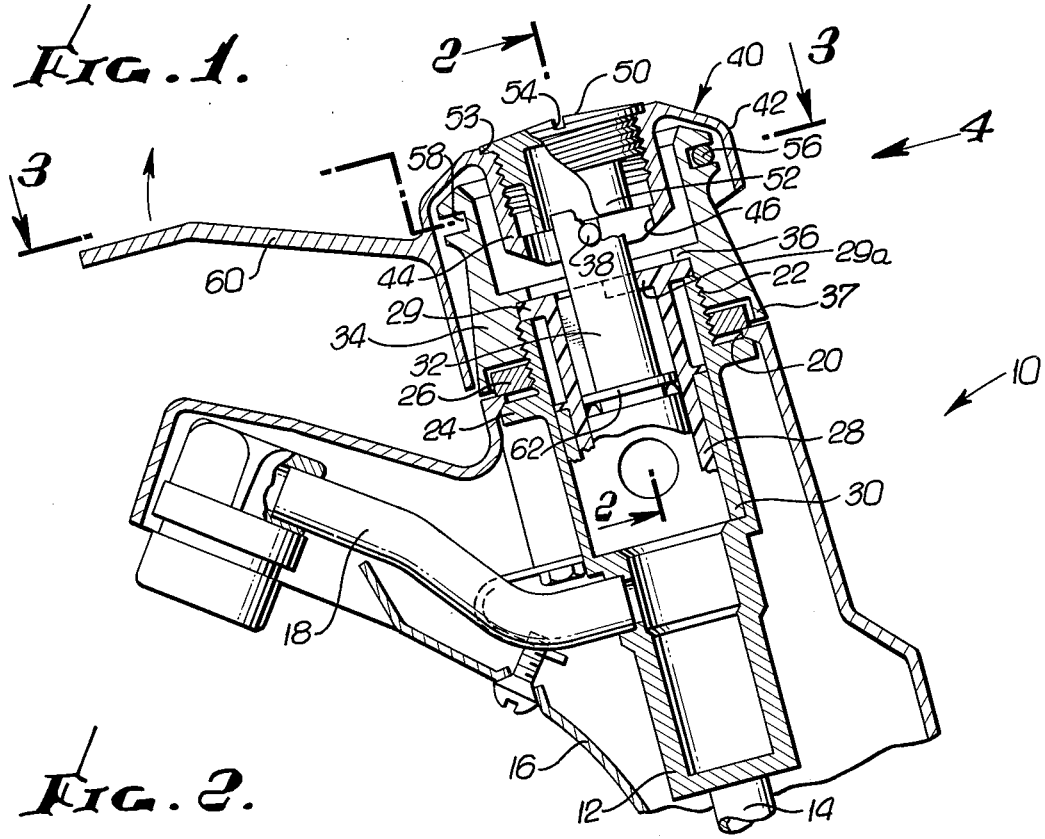
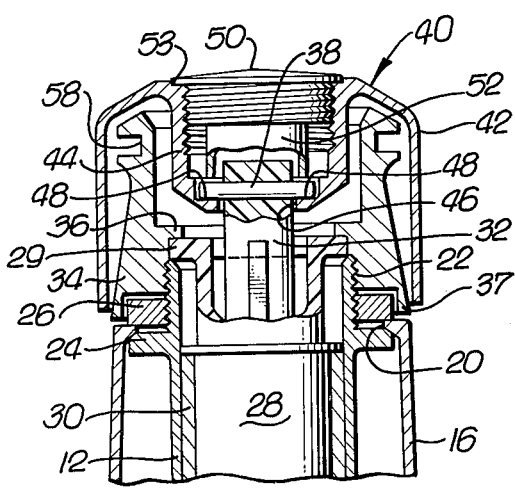
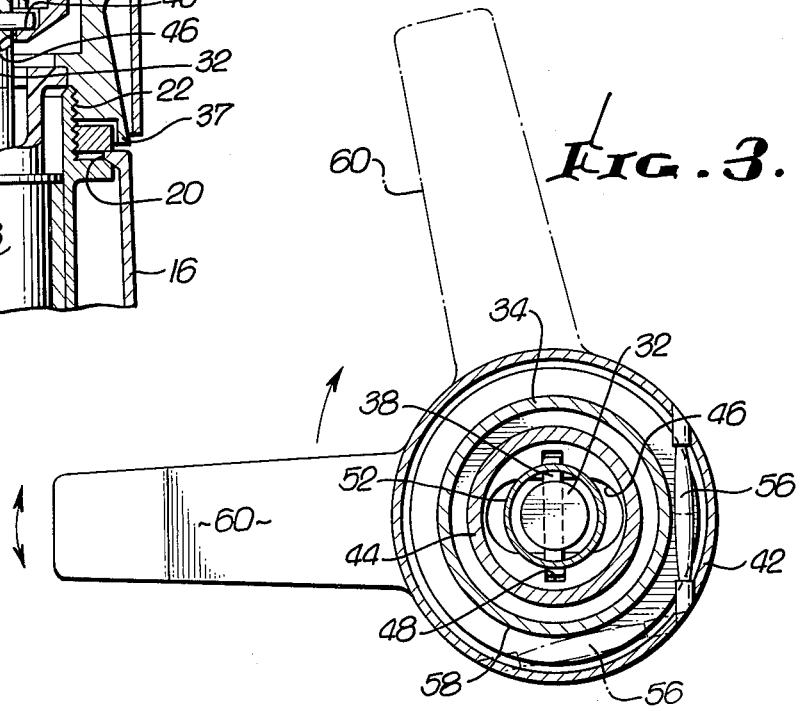

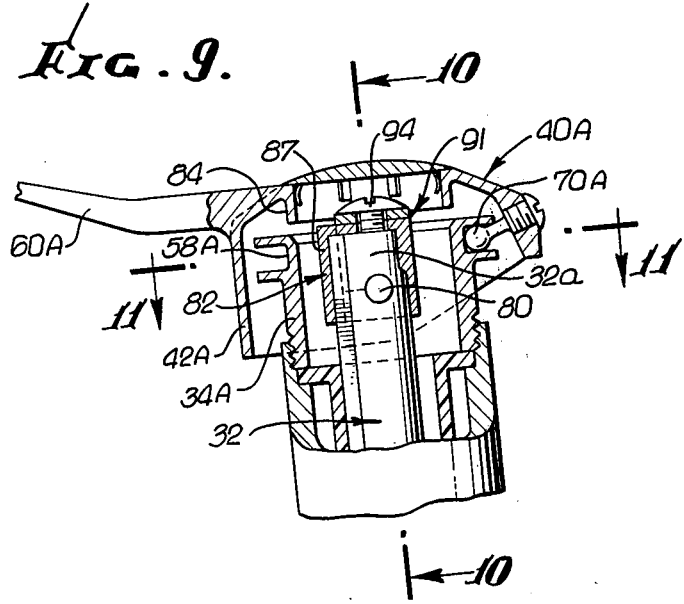
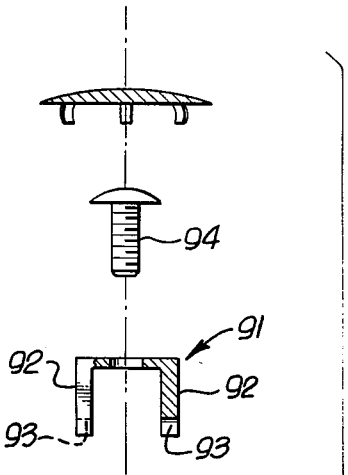
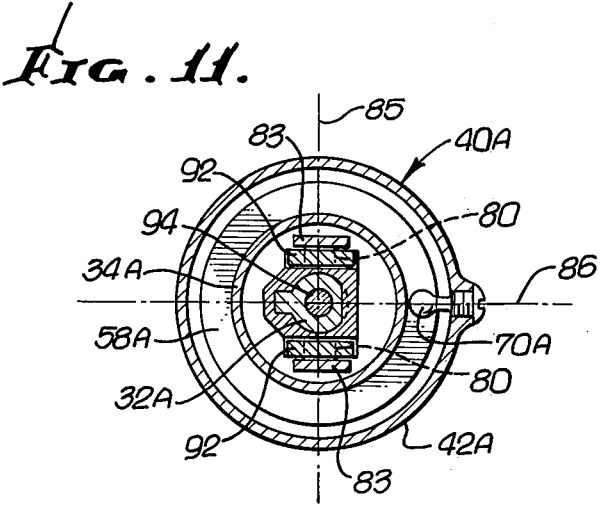
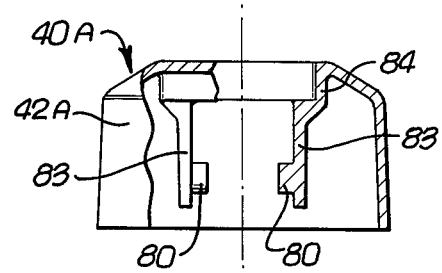
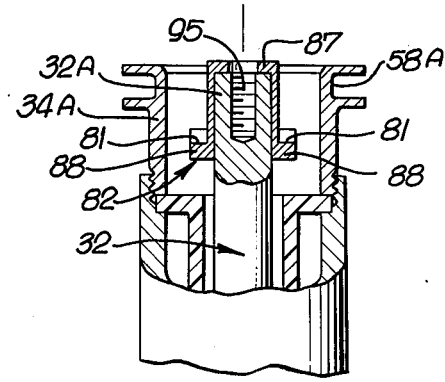
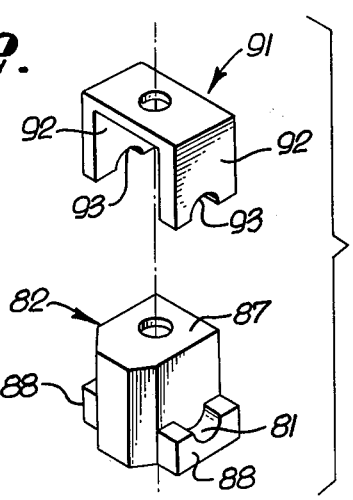

LEVER MECHANISM FOR A MIXING VALVE

BACKGROUND OF THE INVENTION

1. Field of the Invention

This invention relates to a lever mechanism for operating a mixing valve which controls both flow volume and relative proportion of hot and cold water.

2. Description of the Prior Art

In a single handled mixing valve, the axial position of a control stem establishes the flow volume and the angular position of the stem controls the mixture. In typical faucet installations, the valve is operated by a handle which is part of a lever mechanism.

Prior art mixing valve lever mechanisms suffer certain shortcomings. Most have crevices or other recesses which accumulate dirt and soap, and are hard to clean. One object of the present invention is to provide a lever mechanism having a smooth exterior cowl or shield which is easy to clean and which prevents dirt, fluids and the like from getting into the mechanism. Another shortcoming is difficulty of assembly, particularly attachment of the lever arm to the valve control stem. Another object of this invention is to provide an easy to assemble lever mechanism including simplified attachment of the control valve stem.

Typical prior art lever mechanisms are shown in the patent literature. In the Hennessey U.S. Pat. No. 1,693,758, the lever arm has a handle at one end. The other end rides in an angular groove opening inwardly toward the center of the valve cover. The U.S. Pat. No. 1,882,953 to Saelzler discloses a lever handle pivotally connected to the control stem which extends exteriorly of the valve housing. The fulcrum end of the lever handle seats in a bracket integral with a ring which encircles the valve housing and is free to rotate about the valve axis. The control handle shown in the U.S. Pat. No. 2,087,223 to Thompson includes an elongate fulcrum-pin receiving slot which compensates for slack motion of the fulcrum point as the lever is operated.

In the mixing valve assemblies shown in the U.S. Pat. Nos. 2,800,923 and 2,818,878 to Russell, the lever handle projects through an opening in a lever retaining tap threaded to the faucet assembly. A ball-like projection, integral with the pivotally connected end of the lever, rides in a channel opening to the interior of the retaining cap. The ball-like projection is situated on the same side of the control stem as the lever handle. A similar mechanism is shown in the U.S. Pat. No. 2,757,687 to Moen.

SUMMARY OF THE INVENTION

Unlike these prior art devices, the present invention incorporates a cowl which functions both as a component of the lever mechanism and as an easy-to-clean shield that has no recesses to accumulate dirt.

The mixing valve body is retained by a generally cylindrical fulcrum bracket which forms the topmost static element of the fixture containing the valve. The operating lever includes a cowl part which overlies the fulcrum bracket. The lever fulcrum comprises a pin or ball attached to the cowl interior and projecting into an outwardly opening groove around the periphery of the fulcrum bracket.

A cup at the center of the cowl projects into the fulcrum bracket and is pivotally coupled to the mixing valve control stem. With this arrangement, tilting of the cowl imparts axial motion to the valve stem to control flow volume. During such tilting the fulcrum pin or ball moves radially in the fulcrum bracket groove, thereby providing the requisite degree of freedom to the mechanism so that the valve control stem will not be displaced laterally. The cowl can be rotated to impart angular movement to the control stem, thereby controlling mixture. The fulcrum member rides within the receiving groove during such rotation.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

FIG. 1 is a vertical sectional view of a faucet incorporating the inventive lever mechanism for a mixing valve. The valve is shown in the closed position.

FIG. 2 is a sectional view of the lever mechanism of FIG. 1, as seen along the line 2—2 thereof.

FIG. 3 is a transverse sectional view of the lever mechanism, as seen along the line 3—3 of FIG. 1, in a plane perpendicular to the view of FIG. 2.

FIG. 9 is a vertical sectional view of another embodiment of the inventive mixing valve lever mechanism wherein the pivots are formed integrally with the lever member.

FIG. 10 is an exploded, sectional view of the lever mechanism of FIG. 9 as viewed along the line 10—10 thereof.

FIG. 11 is a transverse sectional view of the lever mechanism of FIG. 9 as viewed along the line 11—11 thereof.

FIG. 12 is a pictorial view of the yoke and hold-down components of the lever mechanism of FIG. 9.

DESCRIPTION OF THE PREFERRED EMBODIMENTS

Figure 5:
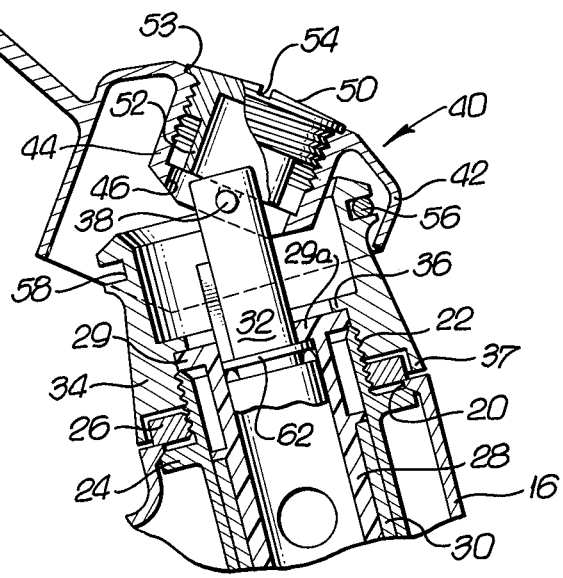
FIG. 5 is a transverse sectional view like FIG. 1, but with the valve open.
Figure 4:
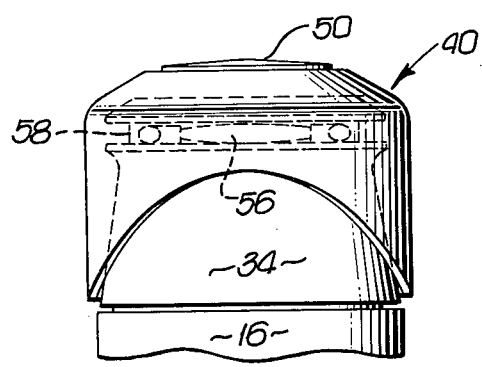
FIG. 4 is an exterior, rear view of the lever mechanism in the direction indicated by the arrow 4 of FIG. 1.

The following detailed description is of the best presently contemplated modes of carrying out the invention. This description is not to be taken in a limiting sense, but is made merely for the purpose of illustrating the general principles of the invention since the scope of the invention best is defined by the appended claims.

Operational characteristics attributed to forms of the invention first described also shall be attributed to forms later described, unless such characteristics obviously are inapplicable or unless specific exception is made.

In FIG. 1 there is illustrated by way of example, a small lavatory fixture 10 incorporating the present invention. The present invention is applicable primarily to single handled mixing fixtures designed to be installed at kitchen, bar or other sinks or basins.

Hot and cold water is conducted to a cast valve body 12 that is generally tubular in form. One of the two supply conduits 14 is shown. This conduit extends, by way of example, upwardly through a hole in the sink deck (not shown). Any suitable arrangement may be used to clamp the body 12 to the deck so that it, and the structures supported thereby, are firmly anchored. One of such structures is a decorative housing 16 that surrounds the rough cast valve body 12. The housing provides a channel accommodating a spout assembly 18 that extends from the valve body 12.

The valve body 12 projects upwardly through an opening 20 in the decorative housing 16. The projecting portion of the body has external threads 22 that serves to clamp the housing 16 in place. Thus the housing opening 20 is formed by a lip that overlies an intermediate peripheral flange 24 formed on the valve body. A nut 26 threaded on the body extension clamps the lip against the flange 24.

The operating parts of the mixing valve in the present instance include a molded plastic cage 28, a pair of seal elements 30 for hot and cold water, and a movable valve stem 32. The mixing valve structure substantially corresponds to that shown and, in more detail, described in said U.S. Pat. No. 3,661,181. The cage 28 has a peripheral flange 29 at its upper end that overlies the end edge of the body extension. The elements of the mixing valve including the stem 32 and the replaceable seal elements 30 are removable with the cage by pulling the cage upwardly from the body 12. However, the cage and its companion parts are held in place by one of the parts of the lever mechanism. This part is a fulcrum bracket 34.

The fulcrum bracket 34 for purposes presently to be described, is preferably made of wear resistant material. It is generally tubular and forms the topmost static element of the fixture 10. The lower end of the fulcrum bracket 34 is interiorly threaded to engage the exterior threads 22 of the valve body. An inwardly extending flange 36 overlies and engages the top flange 29 of the mixing valve cage 28. The fulcrum bracket 34 accordingly clamps the cage 28 in place and by the same means becomes firmly fixed as the topmost static part of the fixture. The fulcrum bracket 34 has a skirt 37 at its lower end that surrounds and thus shields the nut 26. The lower edge of the skirt is designed to lie quite close to the lip of the housing in order to minimize entry of foreign particles.

In order to lift and turn the valve stem 32, its upper end is provided with a cross pin 38 (see also FIG. 2). The projecting ends of the cross pin 38 are pivotally connected to an operating lever 40. The particular configuration of the lever and its mode of attachment to the valve stem are important features of the present invention.

The lever 40 has a generally cylindrical cowl part 42 that is designed to surround and shield the top of the fixture. Thus as shown in FIGS. 1 and 2, the cowl 42 closely surrounds the fulcrum bracket 34.

The upper end of the stem 32 as well as the cross pin 38 extend upwardly into the bottom of a cup 44 that serves as a coupling between the stem 32 and the lever 40. The upper end of the cup extends downwardly from the top or cover part of the cowl 42 and with clearance into the upper end of the fulcrum bracket 34.

The bottom of the cup 44 has a generally oval shaped opening 46 (FIG. 3) through which the stem 32 as well as the cross pin 38 pass upon alignment of the long axis of the opening 46 with the pin 38. When the upper end of the stem 32 and cross pin 38 extend above the opening 46 and into the cup 44, the cup and stem 32 are moved 90° so that the cross pin 38 extends across the recess 46. The cross pin 38 is then in position for its ends to be received in recesses 48 (see also FIG. 2) extending radially outwardly at the sides of the recess and at the bottom of the cup 44. The recesses 48 are just deep enough so that the pin ends lie just below the bottom surface of the cup when the pin ends are seated.

In order to complete the coupling between the stem 32 and the lever 40, a cap screw 50 is provided. The cap screw 50 is threadedly received in the cup 44, and has a skirt 52 (FIGS. 1, 2 and 3) that engages the bottom of the cup 44 and extends across the top of the pin receiving recesses 48 whereby the pin 38 is captured. The cup 44 and the cowl 42 are nonetheless free to move angularly about the axis of the pin 38. In fact, the lever 40 cranks the stem upwardly and downwardly with concomitant relative angular movement of the lever and stem about the axis of the cross pin, and in a manner hereinafter to be described. The top of the cap screw 50 fits flush with the top of the cowl 42 to provide an easily cleaned and neat structure. For this purpose, the cup 44 has a counterbore at 53 to receive the top peripheral flange of the cap screw. A cross slot 54 at the top of the cap screw provides a means engageable with a screw driver, coin or other device capable of serving as a turning tool.

The cranking movement of the stem by the lever 40 is accomplished by providing a fulcrum for the lever which is laterally offset from the axis of the cross pin 38. For this purpose, the lever carries a fulcrum which, in the present instance, is in the form of a pin 56. The pin extends as a chord along the inside of the cowl 42, with its attached ends flush with the exterior surface of the cowl 42. The pin 56, as shown in FIG. 3, extends parallel to the cross pin axis as determined by the recesses 48.

The central portion of the fulcrum pin 56 fits with running clearance into an annular groove 58 formed peripherally and near the top of the fulcrum bracket 34. An offset fulcrum axis is accordingly defined. By tilting the cowl 42 upwardly about the fulcrum pin 56, the cross pin 38 and the stem 32 are carried upwardly, and as shown in FIG. 5. As the cowl is tilted, the fulcrum pin 56 must be allowed to move radially inwardly and outwardly to provide the requisite degree of freedom to the linkage. For this purpose, the groove 58 has suitable depth.

In order to facilitate movement of the lever 40, a handle 60 is provided. The handle projects radially from the cowl 42 on that side of the cowl opposite the fulcrum pin 56. Accordingly, with the handle 60 projecting frontally for manipulation, the fulcrum pin 56 is oriented rearwardly. A right angle relationship is also thus determined between the length of the handle 60 and the axis of the fulcrum pin 56 whereby appropriate lever action is provided.

Sidewise movement of the lever causes the stem 32 to move angularly in the cage 28 thus to achieve change in the mixture. The cross pin recesses 48 exert turning torque upon the cross pin and the valve stem 32. The angular or sidewise position of the operating lever 60 thus corresponds to the proportion of hot and cold water, namely temperature.

As the lever 40 is moved angularly, the fulcrum pin 56 freely rides around the groove 58 in the fulcrum bracket 34. To ensure against binding without holding extremely close manufacturing tolerances, the pin 56 is tapered so that it contacts the groove only at the top and bottom of two points corresponding to the pin at the position of maximum cross sectional diameter. This arrangement also eliminates the possible binding which might occur when the cowl 42 is tilted, should the fulcrum pin 56 not be exactly parallel to the cross pin 38 axis defined by the recesses 48.

The handle 40 can be tilted at any angular orientation of the handle. Correspondingly, the handle 40 can be moved angularly at any tilted position of the handle. A full range of control is thus possible. The limits of angular movement of the handle are determined by internal stops (not shown) acting between the stem 32 and the cage 28. Upward tilting movement is limited by engagement of a shoulder 62 on the stem 32 with an inwardly extending stop-flange 29a at the top of the cage 28. This is shown in FIG. 5. The back of the cowl 42 is cut away in order to allow a full range of tilting movement while maintaining a close compact surrounding relationship of the cowl and fulcrum bracket. The cowl 42 does not contact the fulcrum bracket 34 even when the handle 60 is tilted upwardly to the limit established by the stop-flange 29a. This insures that the stem 32 is all the way out in the fully open position of the faucet 10, and prevents marring of the fulcrum bracket itself.

In order to detach the lever 40, the cap screw 50 is first removed. The lever 60 is then tilted upwardly to the position of FIG. 5, and then moved downwardly. Since the skirt 52 is not in operative position, nothing pushes the cross pin 38 downwardly as the lever is rotated downwardly. Friction causes the stem to remain up and the cross pin to be elevated relative to the oval opening 46. The lever 40 is now rotated 90° to align the cross pin with the length of the oval opening. Tilting movement of the lever causes the lever to clear the crosspin, whereupon the lever can be moved rearwardly to cause the fulcrum pin 56 to move out of the groove 58. The stem 32 is now accessible for removal. The reverse procedure causes the coupling of the lever and the valve stem 32.

Figure 6:
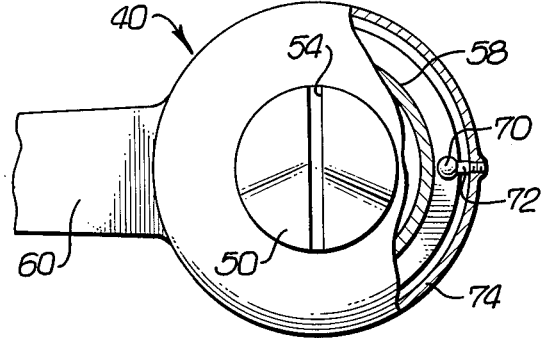
FIG. 6 is a top view, partly broken away and in section, of a lever mechanism like FIG. 1 but employing a fulcrum ball.
Figure 7:
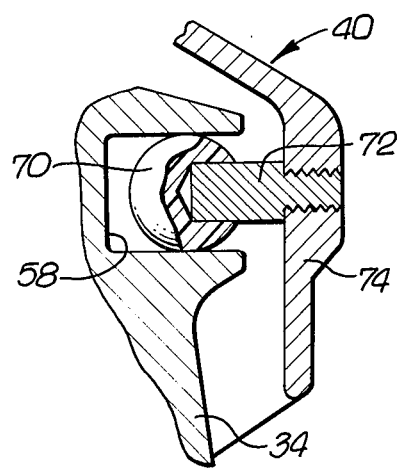
FIG. 7 is a fragmentary transverse sectional view of the fulcrum ball and receiving groove elements of the lever mechanism of FIG. 7.

In the form of the invention illustrated in FIGS. 6 and 7, the fulcrum for the lever is provided by a ball 70. The ball is mounted on the end of a short post 72 that is threadedly mounted on the inside of the cowl 74. Like the pin 56 of the form first described, the fulcrum ball 70 contacts the fulcrum bracket groove 58 only at two points, in this instance at the top and bottom of the ball. Binding is prevented while slack is likewise eliminated.

Figure 8:
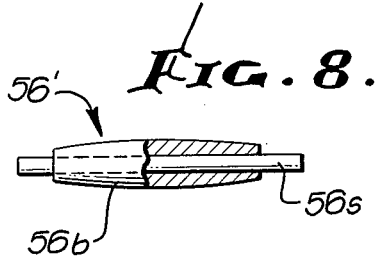
FIG. 8 shows an alternative embodiment of the fulcrum pin employed in the lever mechanism of FIG. 1.

In the alternative configuration of FIG. 8, the fulcrum pin 56' includes a shaft 56s surrounded by a barrel-shaped roller or bushing 56b. Like the pin 56 (FIG. 3), the bushing 56b is tapered and has maximum cross-sectional diameter at the middle of the pin.

The lever 40 forms a clean-lined extension of the decorative housing 16. The fixture is neat in appearance and easily cleaned. The component parts of the mixing valve are readily accessible. No cumbersome snap rings, set screw or other devices need be manipulated for purposes of access to mixing valve parts subject to wear.

An alternative arrangement for pivotal connection of the cowl and valve stem is shown in FIGS. 9–12. In this embodiment, the pivots 80 are integral with the lever member 40A, and are received in recesses 81 in a yoke 82 that is attached to the upper end 32A of the valve stem 32.

The cowl 42A is provided with a pair of spaced, generally parallel pivot arms 83 that extend downwardly from a central cowl ring 84 into the interior of the fulcrum bracket 34A. The integral pivots 80 project inwardly toward each other from the respective pivot arms 83. The common axis 85 of the pivots 80 is perpendicular to the axis 86 through the ball lever 70A used with this embodiment. Of course, this permits free rotation of the cowl lever 40A about the fulcrum 70A.

The yoke 82 includes a cap-like portion 87 that fits over the valve stem upper end 32A. Two diagonally opposite arms 88 project laterally in opposite directions from the lower end of the yoke cap 87. These arms 88 contain the pivot-receiving recesses 81. This insures that as the cowl is rotated using the lever 60A the valve stem will be concurrently rotated without slippage between the cap 87 and the stem 32.

The pivots 80 are retained within the yoke recess 81 by a generally inverted-U-shaped hold-down 91. The member 91 includes downwardly depending legs 92 having recesses 93 at the bottom thereof. The legs 92 slip over the sides of the yoke 82 and meet the arms 88. The recesses 93 align with the recesses 81 in the yoke to form circular openings that receive the pivots 80. Each opening diameter is slightly greater than that of the pivot 80, to allow free rotation thereof. A bolt 94, inserted through holes in the top of the hold-down 91 and the yoke 82, is threaded into a bore 95 in the stem 32A. This secures the hold-down 91 and yoke 82 in place. A cap 95 snaps into the ring 84 to cover the central opening in the cowl 42A.

Disassembly is simple. The cap 95 and the screw 94 are removed and the hold-down 91 is taken off. The cowl 42A then is pivoted upward, removing the pivots 80 from the yoke recesses 81 and situating the pivots 80 above the end of the stem 32. The lever member 40A then can be moved rearwardly to remove the ball fulcrum 70A from the fulcrum groove 58A. The yoke 82 then can be removed from the stem end 32A. Assembly is performed in the reverse order.

Intending to claim all novel, useful and unobvious features shown or described, the applicant claims:

1. In a lever mechanism for use with a mixing valve of the type wherein axial position controls flow volume and angular position controls mixture:

(a) said valve having a body mounted in a fixture and a control valve stem guided by the body for angular movement about the stem axis and for rectilinear movement along the axis, the stem having an upwardly extending accessible end;

(b) a generally cylindrical fulcrum bracket forming an upper end element of said fixture and surrounding the extending end of said control valve stem, said fulcrum bracket having a radially outwardly opening fulcrum member receiving groove extending around at least a portion of the outer periphery thereof concentrically with said stem axis;

(c) an operating lever including a cowl freely overlying said fulcrum bracket and having attached to the inside thereof to be shielded by said cowl, a fulcrum member which projects into said fulcrum member receiving groove with radial clearance; the upwardly extending end of said control valve stem being pivotally connected to the center of said cowl at a transverse axis perpendicular to said stem axis;

(d) tilting of said cowl about said fulcrum member causing axial movement of said valve stem to control flow volume, limited radial movement of said fulcrum member within said groove during said tilting permitting axial movement of said stem without binding, the angular extent of said groove being sufficient to permit angular motion of said cowl with concomitant mixture controlling angular movement of said stem;

(e) said lever having a handle part opposite said fulcrum member whereby said cowl serves as a working element in the transmission of lifting force to said stem.

2. A lever mechanism according to claim 1 wherein said control valve stem includes a cross pin and wherein the top of said cowl includes a central cup extending into the interior of said fulcrum bracket, the bottom of said cup being pivotally coupled to said stem.

3. A lever mechanism according to claim 2 wherein the bottom of said cup includes an oblong opening through which the end of said control valve stem projects, the bottom portions on opposite sides of said oblong opening having at opposite sides cross pin receiving recesses, together with a cap screw insertable into said cup to retain the ends of said valve stem cross pin within said recesses.

4. A lever mechanism according to claim 1 wherein said cowl includes a generally cylindrical skirt covering at least the portion of said fulcrum bracket including said fulcrum member receiving groove, said fulcrum member being a pin with its end attached to the inside of said skirt, said pin defining a chord subtending an arc of said skirt and extending through said groove tangentially of said fulcrum bracket, the maximum diameter of said pin being substantially equal to the width of said groove.

5. A lever mechanism according to claim 4 wherein said fulcrum pin is of non-uniform diameter, the middle of said fulcrum pin having the maximum diameter.

6. A lever mechanism according to claim 5 wherein said fulcrum pin comprises a shaft surrounded by a barrel-shaped roller.

7. A lever mechanism according to claim 1 wherein said fulcrum member comprises a fulcrum ball anchored to the interior of said cowl, said fulcrum ball being disposed within said fulcrum member receiving groove and having a diameter substantially equal to the width of said groove.

8. In a lever mechanism for use with a mixing valve of the type wherein axial position controls flow volume and angular position controls mixture:

(a) said valve having a body mounted in a fixture and a removable control valve stem guided by the body for angular movement about the stem axis and for rectilinear movement along the axis, the stem having an upwardly extending accessible end, there being removable seal elements in the body cooperable with the stem;

(b) a generally cylindrical fulcrum bracket forming an upper end element of said fixture and surrounding the extending end of said control valve stem, said fulcrum bracket being detachably secured to the upper end of said valve body to retain said removable control valve stem and removable seal elements within said body, said fulcrum bracket having a radially outwardly opening fulcrum member receiving groove extending around at least a portion of the outer periphery thereof concentrically with said stem axis;

(c) an operating lever including a cowl freely overlying said fulcrum bracket and having attached to the inside thereof to be shielded by said cowl, a fulcrum member which projects into said fulcrum member receiving groove with radial clearance; the upwardly extending end of said control valve stem being pivotally connected to the center of said cowl at a transverse axis perpendicular to said stem axis;

(d) tilting of said cowl about said fulcrum member causing axial movement of said valve stem to control flow volume, limited radial movement of said fulcrum member within said groove during said tilting permitting axial movement of said stem without binding, the angular extent of said groove being sufficient to permit angular motion of said cowl with concomitant mixture controlling angular movement of said stem;

(e) said lever having a handle part opposite said fulcrum member whereby said cowl serves as a working element in the transmission of lifting forces to said stem.

9. In a lever mechanism for use with a mixing valve of the type wherein axial position controls flow volume and angular position controls mixture:

(a) said valve having a body mounted in a fixture and a control valve stem guided by the body for angular movement about the stem axis and for rectilinear movement along the axis, the stem having an upwardly extending accessible end;

(b) a generally cylindrical fulcrum bracket forming an upper end element of said fixture and surrounding the extending end of said control valve stem, said fulcrum bracket having a radially outwardly opening fulcrum member receiving groove extending around at least a portion of the outer periphery thereof concentrically with said stem axis;

(c) an operating lever including a cowl freely overlying said fulcrum bracket and having attached to the inside thereof to be shielded by said cowl, a fulcrum member which projects into said fulcrum member receiving groove with radial clearance, the upwardly extending end of said control valve stem being pivotally connected to the center of said cowl at a transverse axis perpendicular to said stem axis;

(d) a pair of pivot arms projecting downwardly from said cowl into said fulcrum bracket, said arms having opposed pivot pins extending radially inwardly therefrom; and (e) a yoke member attached to the end of said control valve stem and having recesses therein for receiving said pivot pins, said arms and said yoke cooperating to pivotally interconnect said valve stem and said cowl;

(f) tilting of said cowl about said fulcrum member causing axial movement of said valve stem to control flow volume, limited radial movement of said fulcrum member within said groove during said tilting permitting axial movement of said stem without binding, the angular extent of said groove being sufficient to permit angular motion of said cowl with concomitant mixture controlling angular movement of said stem;

(g) said lever having a handle part opposite said fulcrum member whereby said cowl serves as a working element in the transmission of lifting force to said stem.

10. A lever mechanism according to claim 9 further comprising;

a hold-down overlying said yoke on the end of said valve stem, said hold-down having complementary recesses which together with the yoke recesses form openings for receiving said pivot pins.

11. A lever mechanism according to claim 10 wherein said hold-down is of generally inverted-U-shape, together with fastener means for attaching said hold-down and said yoke to the end of said control valve stem.

12. In a lever mechanism for use with a mixing valve of the type wherein axial position controls flow volume and angular position controls mixture:
   (a) said valve including a valve stem and seal members contained in a valve casing;
   (b) said casing guiding said stem for angular movement about its axis as well as for rectilinear movement along its axis;
   (c) a fulcrum bracket attached to the upper end of said casing, said fulcrum bracket having a generally cylindrical recess into the lower end of which projects the control stem of said mixing valve, the opposite end of said recess being open, the outer periphery of the wall of said cylindrical recess having a radially outwardly opening fulcrum member receiving groove extending concentrically of said stem axis;
   (d) a cowl overlying said fulcrum bracket, said cowl including a top having a central member projecting into the open end of said cylindrical recess, the lower end of said central member being pivotally connected to the end of said mixing valve control stem, said cowl also including a skirt extending from the periphery of said top and covering at least the receiving groove portion of said fulcrum bracket wall; and
   (e) a fulcrum member attached to the inner periphery of said cowl skirt and extending into said receiving groove, said fulcrum member cooperating with said groove to function as a fulcrum of variable radial location for lever motion of said cowl, such lever motion imparting axial movement to said mixing valve control stem without lateral displacement thereof, the angular extent of said receiving groove being sufficient to permit angular motion of said cowl with concomitant mixture controlling angular movement of said stem.

13. A lever mechanism according to claim 12 wherein said fulcrum bracket is threadedly attached to said casing and includes an annular shoulder at one end of said cylindrical recess for retaining mixing valve members within said casing, said control stem projecting through a central opening defined by said shoulder, and wherein said central member comprises a cowl cup, said control stem also projecting through an oblong opening in the bottom of said cowl cup, said control stem having a pivotal mounting cross pin therethrough, the ends of said cross pin being received in corresponding recesses at the bottom of said cowl cup on opposite sides of said oblong opening.

14. A lever mechanism according to claim 13 wherein the depth of said corresponding recesses is at least equal to the diameter of said cross pin ends, and further comprising a cap screw threadedly received within said cowl cup, the bottom of said cap screw covering said recesses to retain said cross pin ends therein, the top of said received cap screw being generally conformal with the top of said cowl to form a relatively smooth exterior surface, said cowl also including a handle projecting from a position diametrically opposite said fulcrum member.

15. In a lever mechanism for use with a mixing valve of the type wherein axial position controls flow volume and angular position controls mixture:
   (a) said valve including a valve stem and seal members contained in a valve casing;
   (b) said casing guiding said stem for angular movement about its axis as well as for rectilinear movement along its axis;
   (c) a fulcrum bracket attached to the upper end of said casing, said fulcrum bracket having a generally cylindrical recess into the lower end of which projects the control stem of said mixing valve, the opposite end of said recess being open, the outer periphery of the wall of said cylindrical recess having a radially outwardly opening fulcrum member receiving groove extending concentrically of said stem axis;
   (d) a cowl overlying said fulcrum bracket, said cowl including a top having a central member projecting into the open end of said cylindrical recess, the lower end of said central member being pivotally connected to the end of said mixing valve control stem, said cowl also including a skirt extending from the periphery of said top and covering at least the receiving groove portion of said fulcrum bracket wall;
   (e) a fulcrum member attached to the inner periphery of said cowl skirt and extending into said receiving groove, said fulcrum member cooperating with said groove to function as a fulcrum of variable radial location for lever motion of said cowl, such lever motion imparting axial movement to said mixing valve control stem without lateral displacement thereof, the angular extent of said receiving groove being sufficient to permit angular motion of said cowl with concomitant mixture controlling angular movement of said stem; and
   (f) said fulcrum member comprising a fulcrum pin, the middle of said fulcrum pin having a maximum diameter substantially equal to the width of said receiving groove, the ends of said fulcrum pin being attached to the interior of said cowl skirt, middle of said fulcrum pin being disposed within said receiving groove, the depth of said receiving groove being sufficient to accommodate the limited radial movement of said fulcrum pin imparted by lever motion of said cowl.

16. In a lever mechanism for use with a mixing valve of the type wherein axial position controls flow volume and angular position controls mixture:
   (a) said valve including a valve stem and seal members contained in a valve casing;
   (b) said casing guiding said stem for angular movement about its axis as well as for rectilinear movement along its axis;
   (c) a fulcrum bracket attached to the inner end of said casing, said fulcrum bracket having a generally cylindrical recess into the lower end of which projects the control stem of said mixing valve, the opposite end of said recess being open, the outer periphery of the wall of said cylindrical recess having a radially outwardly opening fulcrum member receiving groove extending concentrically of said stem axis;
   (d) a cowl overlying said fulcrum bracket, said cowl including a top having a central member projecting into the open end of said cylindrical recess, the lower end of said central member being pivotally connected to the end of said mixing valve control stem, said cowl also including a skirt extending from the periphery of said top and covering at least the receiving groove portion of said fulcrum bracket wall;

(e) a fulcrum member attached to the inner periphery of said cowl skirt and extending into said receiving groove, said fulcrum member cooperating with said groove to function as a fulcrum of variable radial location for lever motion of said cowl, such lever motion imparting axial movement to said mixing valve control stem without lateral displacement thereof, the angular extent of said receiving groove being sufficient to permit angular motion of said cowl with concomitant mixture controlling angular movement of said stem; and (f) said fulcrum member comprising a fulcrum ball mounted at the end of a support anchored to said cowl skirt and extending inwardly thereof, said fulcrum ball being situated within said receiving groove and having a diameter substantially equal to the width thereof, the depth of said receiving groove being sufficient to accommodate the limited radial movement of said fulcrum ball imparted by lever motion of said cowl.

17. In a lever mechanism for use with a mixing valve of the type wherein axial position controls flow volume and angular position controls mixture:

(a) said valve including a valve stem and seal members contained in a valve casing:

(b) said casing guiding said stem for angular movement about its axis as well as for rectilinear movement along its axis;

(c) a fulcrum bracket attached to the upper end of said casing, said fulcrum bracket having a generally cylindrical recess into the lower end of which projects the control stem of said mixing valve, the opposite end of said recess being open, the outer periphery of the wall of said cylindrical recess having a radially outwardly opening fulcrum member receiving groove extending concentrically of said stem axis;

(d) a cowl overlying said fulcrum bracket, said cowl including a top having a central member projecting into the open end of said cylindrical recess, the lower end of said central member being pivotally connected to the end of said mixing valve control stem, said cowl also including a skirt extending from the periphery of said top and covering at least the receiving groove portion of said fulcrum bracket wall;

(e) said central member comprising a pair of pivot arms projecting downwardly from said cowl, said arms carrying a pair of coaxially aligned pivots, a yoke attached to the end of said mixing valve control stem and including upwardly opening recesses receiving said pivots, and a holddown overlying said yoke and including sections covering said recesses to form pivot receiving openings; and (f) a fulcrum member attached to the inner periphery of said cowl skirt and extending into said receiving groove, said fulcrum member cooperating with said groove to function as a fulcrum of variable radial location for lever motion of said cowl, such lever motion imparting axial movement to said mixing valve control stem without lateral displacement thereof, the angular extent of said receiving groove being sufficient to permit angular motion of said cowl with concomitant mixture controlling angular movement of said stem.

18. In a single handled mixing valve:

(a) a valve body;

(b) a control member guided by the body for axial movement and for angular movement about its axis to control volume of flow and relative proportions respectively;

(c) an actuator lever member for moving said control member, comprising a cup-like cowl extending over the upper end of said valve body;

(d) means pivotally connecting the upper end of said control member and the central portion of said cowl whereby the cowl is mounted by the stem for angular movement about an axis perpendicular to the control member axis;

(e) said valve body having a peripheral outwardly extending groove shielded by said cowl, said groove extending concentrically of said control axis;

(f) said cowl having a fulcrum member on the inside thereof that fits with radial clearance in said outwardly extending groove whereby tilting movement of said cowl lifts and lowers said control member;

(g) said actuator lever member also including a handle extension located diametrically opposite said fulcrum member thus to cause such tilting movement of said cowl; and (h) said cowl forming a mechanical link between said handle and said fulcrum member on opposite sides of said control member axis.

19. The combination as set forth in claim 18 in which said pivotally connecting means is downwardly offset from the center of the cowl whereby the said pivotally connecting means undergoes an excursion both above and below the level of said fulcrum member between open and closed positions of said valve.

20. The combination as set forth in claim 19 in which said cowl has a removable cap for concealing said pivotally connecting means.

21. The combination as set forth in claim 18 in which said central portion of said cowl has a slot and the upper end of said control member has a cross pin, the cross pin being movable through the slot when longitudinally aligned therewith; said slot having seats at opposite sides of said slot for receiving said pin upon turning the cross pin across the slot; and means confining the cross pin in its seats.

* * * * *